G. R. FULLENWIDER.
TOOL KIT.
APPLICATION FILED DEC. 19, 1919.
1,417,725.
Patented May 30, 1922.
2 SHEETS—SHEET 1.
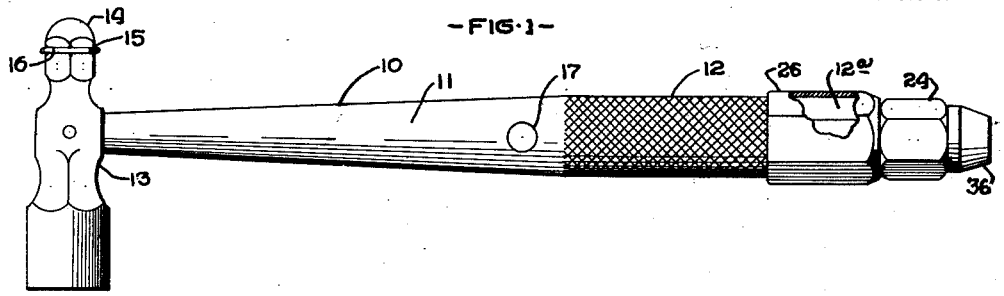
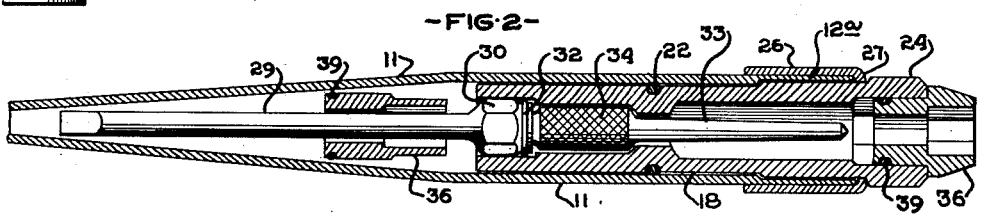
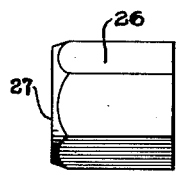
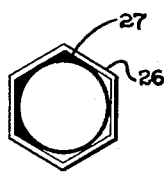
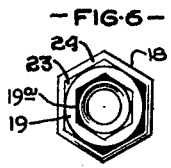
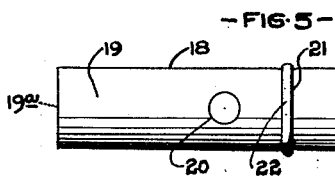
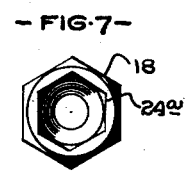
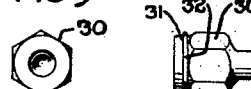
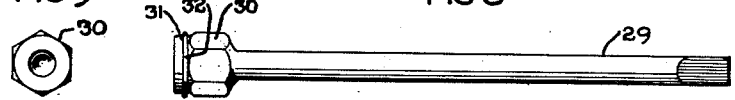
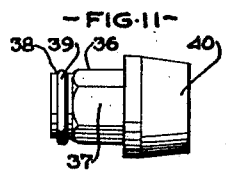
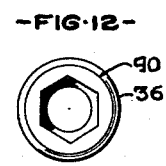
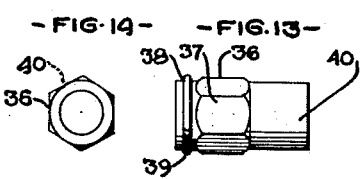
WITNESS:
R. L. Greist
INVENTOR
GEORGE R. FULLENWIDER
BY Cromwell Greist & Warden
ATTORNEYS

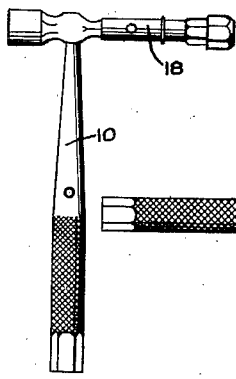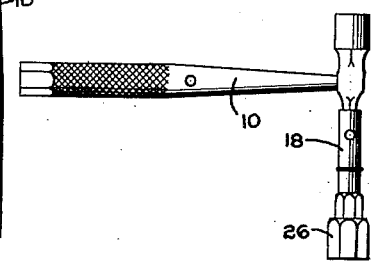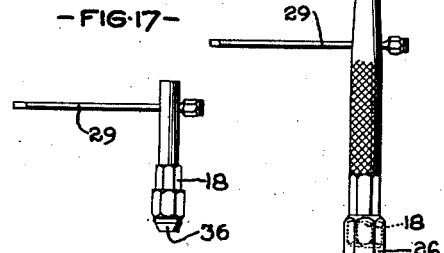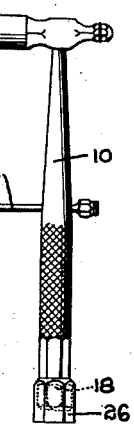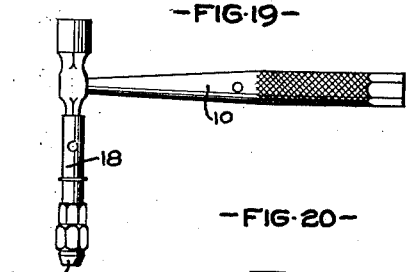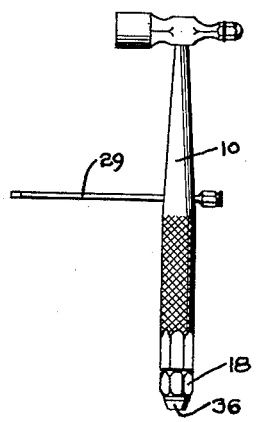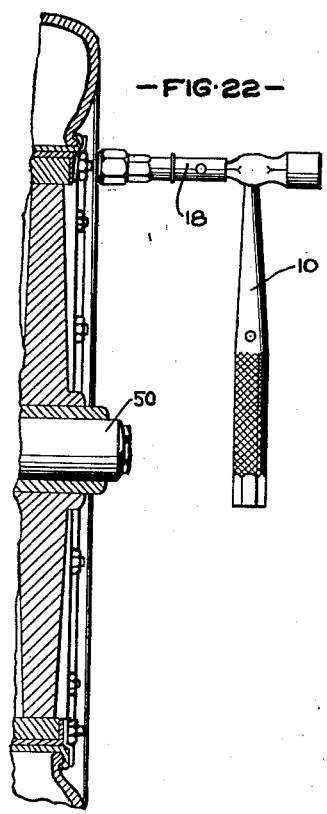

UNITED STATES PATENT OFFICE.

GEORGE R. FULLENWIDER, OF MAPLE VALLEY, WASHINGTON, ASSIGNOR OF ONE-HALF TO OLOF OLSON, OF MAPLE VALLEY, WASHINGTON.

TOOL KIT.

1,417,725.

Specification of Letters Patent. Patented May 30, 1922.

Application filed December 19, 1919. Serial No. 346,007.

*To all whom it may concern:*

Be it known that I, GEORGE R. FULLENWIDER, a citizen of the United States, residing at Maple Valley, in the county of King and State of Washington, have invented certain new and useful Improvements in Tool Kits, of which the following is a specification.

The objects of the present invention are to provide a tool kit composed of a plurality of simple implements adapted through various combinations to form the tools most commonly employed in emergency repair work on automobiles; to provide, as a master implement, a hammer with means for operatively engaging various supplementary implements; and to utilize said hammer for housing the supplementary implements.

The average tool kit carried by automobile drivers consists of a number of individual wrenches for nuts of various sizes, a rim wrench, spark-plug wrench, screw-driver, hammer, and punch. Not infrequently, one or more of these separate tools becomes misplaced or lost as a result of using it elsewhere than on the car, and as to those tools which are designed especially for automobile work it is found that under certain conditions they have little if any efficiency and cannot be operated except with considerable difficulty. This is particularly true of the ordinary brace rim wrench and the spark-plug wrench or socket. The former, because of the character of thrust imparted therethrough has a strong tendency to turn the wheel, making it necessary to firmly brace the wheel with the foot, which is awkward, and even by an expert, cannot be accomplished without some loss of time and motion. In the case of a tight fitting spark-plug it is often found that the spark-plug wrench or socket in the average equipment does not provide for the employment of sufficient leverage to seat or loosen the plug, and this is a fault that generally applies to the individual nut wrenches. These and other difficulties are avoided through the use of the present invention.

In order that the various aspects of the same may be readily understood and the points of superiority appreciated, a preferred embodiment of the invention is hereinafter described in conjunction with the accompanying drawings. It is to be understood, however, that the description and drawings are illustrative only and are not to be considered as limiting the scope of the invention.

In the drawings—

Figure 1 is an exterior view showing the compact appearance of the device when the supplementary implements are housed within the hammer;

Fig. 2 is a longitudinal section through Fig. 1 with the hammer head omitted;

Fig. 3, a view of a supplementary nut or spark-plug socket;

Fig. 4, a detail of the nut-engaging end thereof;

Fig. 5 shows the external details of a rim nut socket;

Figs. 6 and 7, the end views thereof;

Fig. 8 represents the screw-driver implement;

Fig. 9 is an end view of the connecting portion thereof;

Fig. 10 shows a punch;

Figs. 11 and 13 are side elevations of supplementary nut sockets;

Figs. 12 and 14 are respectively end views of the nut-engaging ends and the connecting portions thereof;

Fig. 15 illustrates the association of the hammer and the rim nut implement in forming a rim wrench;

Fig. 16 shows how the hammer, rim nut implement, and supplementary spark-plug are joined to form a spark-plug wrench;

Fig. 17 shows a wrench consisting of the rim nut implement, a supplementary socket, and the screw-driver;

Fig. 18 is another combination of the hammer, rim nut implement, and supplementary spark-plug socket, with the screw-driver employed to afford increased leverage;

Fig. 19 shows a supplementary socket added to the combination shown in Fig. 15, for the purpose of fitting a different sized nut;

Fig. 20 shows one of said supplementary sockets substituted for the spark-plug socket in the combination of Fig. 18;

Fig. 21 shows a complete screw-driver formed by the combination of the nut-wrench implement and the screw-driver implement; and Fig. 22 illustrates the application of the combination shown in Fig. 15 to an automobile wheel rim.

Referring to the drawings, the numeral 10 designates generally the hammer or master implement, said hammer being of the ball peen type, the shank 11 thereof being hollow and preferably gradually increasing in diameter towards the handle portion 12. The exterior of handle 12 is nurled to provide for a firm grip. The lower or open end of said shank is externally and internally polygonal in cross-section, preferably hexagonal, the inner recess forming a socket 12ª which will engage a corresponding nut or a spark plug and actuate the same by movement imparted through the shank 11, the head 13 of the hammer in this case being used as a wrench handle as shown in Fig. 15. The body portion of the peen 14 is polygonal and is provided with an annular groove 15 which carries a split expansion ring 16, normally of slightly larger diameter than the lesser diameter of said peen. Alined openings 17 are provided at about the middle of the shank 11.

The extension member or rim wrench implement is designated generally by the numeral 18 and comprises a tubular body portion 19, the outer diameter of which is slightly less than the interior diameter of the handle 12. Alined openings 20, of the same size as the openings 17, are provided near the middle of body portion 19. In the upper half of said body portion an annular groove 21 is formed which carries a split expansion ring 22.

One end of extension member 18 is formed with a polygonal bore to form a socket 19ª complementary to the body portion of peen 14. The other end of said extension member comprises a polygonal neck 23 and enlarged head 24, the neck being adapted to interfit the socket 12ª, and the inner recess 24ª of the head being designed to operatively engage a rim nut. The exterior of head 24 being polygonal, it will interfit a supplementary spark-plug socket member or nut socket member 26 of larger size than the socket 12ª. A detail of good construction is the chamfered edge 25 on the head 24 which allows free access to the rim nuts and avoids binding through contact with the rim wedges on an automobile wheel.

The socket 26 has an annular flange 27 at one end thereof, which will seat upon the shoulder 28 between the neck and head of extension member 18, thus preventing the socket from slipping off when brought into operative relation as shown in Figs. 16 and 18.

Numeral 29 designates the shank portion of a screw-driver, having a polygonal head portion 30 corresponding to the body portion of peen 14, and also having an annularly grooved extension 31 in which is seated a split tension ring 32. A complete screw-driver is formed by interfitting the head 30 with the complementary socket 19ª of implement 18 (see Fig. 21). The headed end of said screw-driver is axially bored as shown in Fig. 9. The openings 17 in the hammer 10, and openings 20 in implement 18 are of such size as to receive the shank 29 of the screw-driver.

The punch 33 has an enlarged nurled grip 34, and a head end 35 of such diameter as will allow it to enter the bore in the head 30 of screw-driver 29, for housing purposes.

Several supplementary tubular nut socket members 36 may be added to the kit, each of such members having a polygonal body 37 with a reduced annular grooved extension 38 at one end thereof, a split tension ring 39 being carried in the groove of said extension. At the other end a polygonal socket 40 is provided, the sizes of the sockets in these supplementary implements being varied to fit nuts of smaller sizes than those to be engaged by the sockets 12ª, 24ª and 26. In use the polygonal body 37 is inserted into the socket 24ª of implement 18 where it is detachably held by the action of the split ring 39. In some instances, the work to which socket 24ª, or one of the implements 36 is applied, may be performed by utilizing the screw-driver 29 as a handle, a capacity in which the latter member may readily serve by merely projecting it through the openings 20 in implement 18 as shown in Fig. 17. In case greater leverage is required, the extension member 18 may be inserted within the socket 12ª at the lower end of the handle and operated by the head 13, and by a lever arm provided by inserting the screw-driver 29 through the openings 17, as illustrated in Fig. 20. Or if still greater power is necessary, the extension member 18 may be fitted upon the peen of hammer 10 as shown in Fig. 15, the shank of the hammer now being used as the operating arm. It is in this relation that the hammer and extension member 18 are combined to form a rim wrench. The operator grasps the body portion 19 of the implement with one hand and with the other spins the nut on or off. Because of the proximity of the fulcrum to the work, the rotary motion is more fully confined to the nut than is the case with the ordinary brace wrench, in view of which fact, movement of the wheel can be resisted by the hand of the operator. In this respect particularly the present device is a great improvement over all existing types of rim wrenches. It will be seen by referring to Fig. 22 that there is ample clearance between the handle of the hammer and the hub 50 of the wheel.

The handle of hammer 10 being tubular may be utilized to house the several implements. They are assembled for this purpose as follows. One or more of the supplementary socket members 36 are collected upon the shank of screw-driver 29 which is dropped into the handle 11, blade end first. The socket member 26 is then passed over the body portion 19 of extension member 18 with the flanged end first, the punch 33 inserted therein, pointed end first, and the remaining socket member 36 brought into its operative engagement with the socket 24ª, whereupon the extension member 18 is inserted into the handle 11, the neck 23 of the former being embraced by the socket 12ª and held in position by the ring 22. The parts are thus compactly and securely kept together and there is little likelihood of loss of any single implement, as it is only in combination with one or more of the others that any of the elements has any efficiency, in view of which there will be no good purpose served in borrowing from the kit for work other than that to which the device is especially adapted.

I claim:

1. A tool kit comprising a body having a hollow handle and a transverse head, and a plurality of associated work-engaging implements adapted for assembly within the handle and selectively upon the head for operative manipulation by the body, and including means for retaining said body and implements against relative rotation when assembled.

2. A tool kit comprising an implement having a hollow handle and a transverse head, and a wrench implement adapted for operative association with the implement within the handle and also upon the head to form an operable extension thereof at substantially right angles to the handle.

3. A tool kit comprising an implement having a hollow handle and a transverse head, and an extension member adapted for telescopic insertion into the handle and for operative mounting upon the head to form a longitudinal extension thereof, said extension member having work-engaging portions operable through manipulation of the implement with the extension member in either of said positions.

4. A tool kit comprising a body having a hollow handle and a transversely extending head portion, an extension member insertable within the body portion and having parts to engage the same and the head portion whereby it may be rotated upon manipulation of the body portion, and an implement adapted to be mounted on the extension member for operation thereby with the extension member in either position.

5. A tool kit comprising a body having a handle portion and a transversely extending head portion, a tubular extension portion insertable within the handle, and a work engaging implement adapted for operative mounting upon the extension member and insertable therewith into the handle portion.

6. A tool kit comprising a body including a handle portion and transversely extending head portion, a tubular extension member adapted for insertion into the handle portion and for operative engagement by the head portion, means for retaining the extension against rotation in the handle, and an implement arranged to be retained within the handle portion by the extension member when the latter is inserted therein.

7. A tool kit comprising a body having a handle portion and a transversely extending head portion, a tubular extension member adapted for non-rotary mounting upon the handle portion and adapted for non-rotary operative engagement by the head portion, and an implement operably mounted upon the extension member for retention thereby upon the handle portion.

8. A tool kit comprising a body having a handle portion and a transversely extending head portion, an extension member adapted for telescopic assembly with the handle portion and for operative non-rotary engagement inter-changeably with the handle portion and the head portion, and an implement arranged to be mounted on the extension member for effective operation by manipulation of the body.

9. In a tool kit a body including a handle portion and a transversely extending head portion, an extension member arranged for non-rotary engagement within the handle portion, an implement insertable within the handle portion and adapted for operative engagement selectively with the body and the extension.

10. In a tool kit a body including a hollow handle portion, an extension member telescopically interfitting the hollow handle, and a work-engaging implement adapted for operative engagement with the extension member and formed for retention by the extension member interior and exterior of the handle portion when the extension member is thereon.

11. A tool kit comprising a body having a hollow handle portion, an extension member adapted for non-rotary operative mounting upon different portions of the body, an implement arranged for operative mounting upon the extension member, said implement and extension member being formed for disposal in telescopic relationship within the hollow handle.

12. A tool kit comprising a body portion including a hollow handle, an extension member adapted for non-rotary operative engagement with the body in different positions relative thereto, and implements arranged for operative mounting at the ends of said extension member, said extension member and said implements being formed for disposal in telescopic relationship within the hollow handle portion.

13. In a tool, a shank portion, an extension member removably mounted on the shank portion and having a protruding end of polygonal contour, and a socket member telescopically fitting the end of the shank and including means whereby it is retained thereon by the extension member, said socket member having a part adapted to fit over said protruding end of the extension member to provide an open-ended socket, the extension member being adapted for rotative operation by the shank.

14. In a tool, a shank portion, an extension member telescopically insertable into the shank portion and having a polygonal protruding extremity, a socket member reversibly associated with the shank and extension member and having parts adapted to fit over either the end of the shank or said protruding extremity, and means for retaining the extension member against rotation relative to the shank.

15. A detachable implement for a tool affording a uniform bore, said implement having a work-engaging portion and a neck portion adapted to fit in the bore, and a contractible resilient ring mounted on said neck portion and adapted for yielding contact against the wall of the bore when inserted therein, to retain the implement on the tool.

In testimony whereof I have hereunto signed my name in the presence of two subscribing witnesses.

GEORGE R. FULLENWIDER.

Witnesses:
FRANKLIN M. WARDEN,
FRANCES K. GILLESPIE.